(12) United States Patent
Kapsalakis et al.

(10) Patent No.: US 12,401,581 B2
(45) Date of Patent: Aug. 26, 2025

(54) ENTITY ATTRIBUTE DESIGNATION BASED ON LOGIC PROGRAMMING

(71) Applicant: FORESCOUT TECHNOLOGIES, INC., San Jose, CA (US)

(72) Inventors: Michail Kapsalakis, San Jose, CA (US); Daniel Ricardo dos Santos, Rotterdam (NL); Davide Fauri, San Jose, CA (US)

(73) Assignee: Forescout Technologies, Inc., San Jose, CA (US)

( * ) Notice: Subject to any disclaimer, the term of this patent is extended or adjusted under 35 U.S.C. 154(b) by 0 days.

(21) Appl. No.: 18/373,778

(22) Filed: Sep. 27, 2023

(65) Prior Publication Data

US 2024/0031260 A1   Jan. 25, 2024

Related U.S. Application Data

(63) Continuation of application No. 17/489,890, filed on Sep. 30, 2021, now Pat. No. 11,848,839.

(51) Int. Cl.
*H04L 43/062* (2022.01)
*G06F 18/213* (2023.01)
*H04L 9/40* (2022.01)
*H04L 41/0893* (2022.01)
(Continued)

(52) U.S. Cl.
CPC .......... *H04L 43/062* (2013.01); *G06F 18/213* (2023.01); *H04L 41/0893* (2013.01); *H04L 43/0811* (2013.01); *H04L 43/0882* (2013.01); *H04L 63/1408* (2013.01); *H04L 63/20* (2013.01)

(58) Field of Classification Search
CPC . H04L 41/0893; H04L 63/1408; H04L 63/20; H04L 43/062; H04L 43/0811
See application file for complete search history.

(56) References Cited

U.S. PATENT DOCUMENTS 10,263,863 B2   4/2019  Mukerji et al.
11,296,971 B1 *  4/2022  Jain ................... H04L 43/08
11,848,839 B2 * 12/2023  Kapsalakis ......... H04L 41/0893
(Continued)

OTHER PUBLICATIONS

International Search Report and Written Opinion of Application No. PCT/US2022/045283, mailed Jan. 20, 2023, 8 pages.
(Continued)

*Primary Examiner* — Jerry B Dennison
(74) *Attorney, Agent, or Firm* — Womble Bond Dickinson (US) LLP

(57) ABSTRACT

Systems, methods, and related technologies for entity classification and attribute designation are described. Device property data of a device coupled to a network is accessed. Features of the device are identified based on the device property data. A first value for an attribute of the device is determined based on a rule applied to the one or more features of the device, wherein a belief value for the first rule is associated with the first value. A final value for the attribute of the device is selected based on the first belief value for the first value of the attribute. An explanation of the selection of the final value for the attribute is provided and a security action is performed on the entity based on the final value for the attribute of the entity and a security policy associated with the final value for the attribute.

20 Claims, 9 Drawing Sheets

(51) Int. Cl.
*H04L 43/0811* (2022.01)
*H04L 43/0882* (2022.01)

(56) References Cited

U.S. PATENT DOCUMENTS

| | | | | |
|---|---|---|---|---|
| 12,081,519 | B2* | 9/2024 | Fainberg | G06F 21/577 |
| 2006/0056389 | A1* | 3/2006 | Monk | H04L 41/0677 |
| | | | | 370/352 |
| 2008/0298804 | A1* | 12/2008 | Noble | H04J 14/021 |
| | | | | 398/45 |
| 2012/0271941 | A1* | 10/2012 | Mirandette | G06F 16/955 |
| | | | | 709/224 |
| 2014/0136690 | A1* | 5/2014 | Jain | H04L 67/63 |
| | | | | 709/224 |
| 2019/0132429 | A1* | 5/2019 | Bharti | H04L 67/12 |
| 2020/0106675 | A1 | 4/2020 | Sirton | |
| 2020/0136937 | A1* | 4/2020 | Savalle | H04L 43/022 |
| 2020/0151622 | A1* | 5/2020 | Mermoud | G06N 20/00 |
| 2020/0160100 | A1* | 5/2020 | Mermoud | H04L 43/08 |
| 2020/0210871 | A1* | 7/2020 | Alperovich | G06N 20/00 |
| 2020/0358794 | A1* | 11/2020 | Vasseur | G06F 16/285 |
| 2020/0396129 | A1* | 12/2020 | Tedaldi | H04L 43/04 |
| 2021/0303598 | A1* | 9/2021 | Mermoud | G06F 16/285 |
| 2021/0328986 | A1* | 10/2021 | Vasseur | H04L 63/20 |
| 2021/0335505 | A1* | 10/2021 | Tedaldi | G06F 18/251 |
| 2022/0385634 | A1* | 12/2022 | Fainberg | H04L 41/0894 |
| 2023/0099243 | A1* | 3/2023 | Kapsalakis | H04L 43/062 |
| | | | | 709/224 |

OTHER PUBLICATIONS

International Search Report and Written Opinion of Application No. PCT/US2022/045283, mailed Apr. 2, 2024, 5 pages.

* cited by examiner

700 ⟶

```
Role("10.5.8.160","bms","true")
 |- candidate_role("10.5.8.160", "bms", "true")
 |   |- msg("id_b178a869", "10.5.0.138", "10.5.8.160", "BACNET")
 |   |- bacnet_has_NPDU("id_b178a869", "yes")
 |   |- msg_type("id_b178a869",
 |               "SIMPLE_ACK_CONFIRMED_EVENT_NOTIFICATION")
 |- !conflict("10.5.8.160", "bms")

first_seen("id_b178a869", "2020-01-01T01:23:45.000")
last_seen("id_b178a869", "2021-05-27T12:48:02.724")
times_seen("id_b178a869", 259)
```

FIG. 7

ENTITY ATTRIBUTE DESIGNATION BASED ON LOGIC PROGRAMMING

CROSS REFERENCE TO RELATED APPLICATION

This application is a continuation of U.S. patent application Ser. No. 17/489,890, filed Sep. 30, 2021, the entire contents of which are hereby incorporated by reference.

TECHNICAL FIELD

Aspects and implementations of the present disclosure relate to network monitoring, and more specifically, attribute assignment and classification of entities of a network.

BACKGROUND

As technology advances, the number and variety of devices or entities that are connected to communications networks are rapidly increasing. Each device or entity may have its own respective vulnerabilities which may leave the network open to compromise or other risks. Preventing the spreading of an infection of a device or entity, or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 7 depicts an example output explanation in the form of a derivation tree, according to embodiments of the present disclosure.

DETAILED DESCRIPTION

Figure 1:
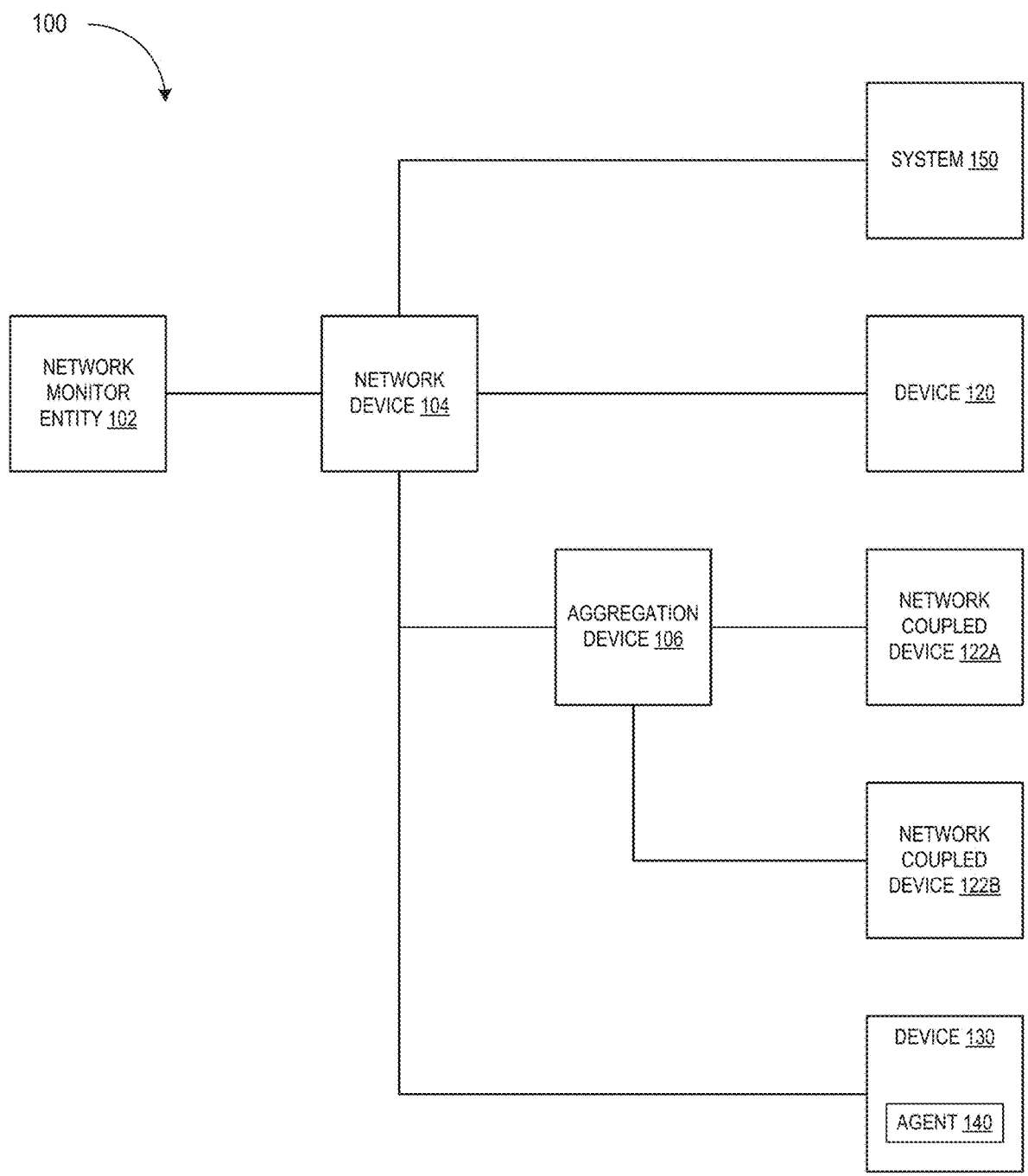
FIG. 1 depicts an illustrative communication network in accordance with one implementation of the present disclosure.

Aspects and implementations of the present disclosure are directed to device classification and attribute designation using logic programming. The systems and methods disclosed can be employed with respect to network security, among other fields. More particularly, it can be appreciated that devices or entities with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Classification of devices and attribute designation can be particularly important for securing a network because lack of knowledge about what an entity is can prevent application of appropriate security measures. Accordingly, described herein in various implementations are systems, methods, techniques, and related technologies, which allow for improved entity classification and attribute designation to enable securing of a network including applying and performing one or more network security policies based on attributes and classification of an entity.

Accordingly, knowing precisely what devices exist in a monitored network, a capability known in the network security community as asset inventory, can be used for effective security controls within a network. In the current heterogeneous device landscape of the Internet of Things (IoT), asset inventory can be achieved by monitoring network traffic, identifying individual devices from the network traffic, fingerprinting the devices by assigning attributes to the individual devices (e.g., operating system, firmware version, vendor name, etc.), and classifying those devices into a network role or function (e.g., smartphone, VoIP phone, printer, IP camera, etc.) that concisely expresses a device's functionality and behavior, such as an engineering workstations, programmable logic controller, gateway, etc.

Conventionally, classification of a device, or entity, is performed in two steps. First data is collected from user input (e.g., domain expert input) or from monitoring of the network (e.g., via passive monitoring or active requests for device information) which is then parsed to extract evidence for device classification. The evidence may include device characteristics that can be extracted or identified from the data collected from used input or monitoring of the network. The second step of device classification uses the extracted evidence to assign attributes (e.g., a role or function) to a device. Conventional device classification algorithms can be learning-based or knowledge-based. Learning-based classification algorithms, such as artificial neural networks, support vector machines, and other machine learning algorithms, can support uncertain classifications. However, learning-based classification algorithms do not allow an operator/user to inspect how or why a certain classification decision was made. Thus, learning-based classifiers may lead to a loss of trust by users, especially for critical systems. Knowledge-based heuristics (e.g., deterministic decision rules specified by domain experts) can include clear semantics that provide for improved understandability of classification decisions. However, such deterministic rules do not represent uncertainty in their outcomes.

Issues with conventional knowledge-based classification algorithms is that they do not represent uncertainty in their outcomes even though the attribute designation and classification process may be inherently uncertain. Attribute designation and classification are uncertain because in many instances not all evidence needed for a classification is available in the collected evidence. For example, data collection may be limited by the visibility of the network monitors, the limited time span of data collection, etc. Additionally, the available evidence may be only a suggestion or probable indication of an attribute or role of a device rather than definitive or decisive proof of the attribute or role. Therefore, classification algorithms may need to make classification decisions based on incomplete evidence, or less than enough evidence for a completely certain classification. While learning-based classification algorithms may support classification with uncertainty, they are limited because the classification decisions are not transparent or understandable to a user, undermining the user's trust and willingness to use such an algorithm to secure their network.

Accordingly, described herein in various implementations are systems, methods, techniques, and related technologies, which improve attribute designation and device classification using logic programming that supports uncertainty and explanations of outcomes. Embodiments may overcome the problems of conventional device classification using defined logical predicates for assigning attributes to network devices and inferring roles from the attributes which also account for uncertainty of the predicate. The output from a logical predicate (e.g., the suggested attribute or classification) can include a belief value indicating a level of certainty and statement validity associated with the attribute or classification of the output. For example, each logical predicate that is defined may include a belief value based on the features or evidence required by the logical predicate. Multiple logical predicates may be met for a device resulting in the potential for conflicts between classifications. Any conflicts between outputs of the logical predicates can be addressed to select only one of the conflicting output classifications or attributes for the device.

Embodiments include a methodology to capture observable facts (e.g., descriptive properties about a device) referred to as evidence, about a device by monitoring network traffic of the device. For example, one or more monitoring sensors may capture and parse network messages of devices on a network. The one or more monitoring sensors may be connected locally to the network being monitored. The one or more monitoring sensors may assign a global identifier to each device of the network which can be used to collect evidence from network traffic associated with each device. In some embodiments, the extracted evidence for each device may be represented as a combination of features (e.g., as a tuple of features). The evidence collected by each of the one or more monitoring sensors may be provided to a central location (e.g., data store, cloud service, etc.) to be used for device classification.

In some embodiments, features of devices are encoded as logical predicates. The logical predicates can be divided into core predicates and additional predicates. Core predicates link the set of all required features of a device or communication to a unique identifier. For example, the core predicate for a message may include an identifier (ID), a source (SRC), a destination (DST), and a protocol for a device (e.g., msg[id_1234, SRC="01/10.0.0.100", DST="01/10.0.0.200", Protocol=MODBUS]). Additional predicates link the value of other features to that same ID from the core predicate to provide extensibility with new optional features. All predicates can then be added to a global predicate set to prevent inconsistencies that would arise when applying heuristic rules on partial information.

In some embodiments, heuristic rules are encoded as logical if-then implications between predicates. Each rule assigns an attribute (e.g., a device role classification) to a device if a combination of features matches known indicators. For example, a rule may assign the role "DHCP server" to a device receiving a message where features "Protocol" and "DstPort" have values "DHCP" and "68", respectively.

With such encoding of heuristic rules, a logical reasoning module can designate attributes from the collected evidence based on the rules. A belief value for the heuristic outcome may be associated with each attribute. For example, each rule produces an output predicate including the device ID, a value of the attribute, and a belief value associated with the value of the attribute. In some embodiments, a belief value of "Unknown" may indicate maximum uncertainty about the attribute (e.g., there was incomplete or no evidence for the attribute). Similarly, a belief value of "Probably True" or "Probably False" may indicate partial confidence about the attribute and the belief values "True" or "False" may indicate strong confidence about the attribute. It should be noted that the belief values may be represented using any other semantics indicating values of certainty from a maximum uncertainty to complete certainty.

In some embodiments, application of the heuristic rules to evidence associated with a device may result in multiple rules assigning different values or certainty levels for the same attribute of the device. Such cases may result in conflicting values for the attribute (e.g., attribute conflicts) or conflicting certainty levels for the same value of the attribute (e.g., logical conflicts). Logical conflicts may arise when multiple attributes assignments have the same value but different certainty levels. For example, a device may be assigned the same role "PLC" with belief values of 1) Probably True, 2) True, and 3) False. The logical reasoning module may resolve these conflicts by discarding all assignments except those with the lowest uncertainty (e.g., the highest certainty). Any remaining conflicts will involve assignments of opposing validity but with equal uncertainty (e.g., True and False, or Probably True and Probably False). Therefore, in the above example, the assignment with the belief value Probably True would be discarded, leaving True and False (e.g., equal certainty but opposite validity indication). When conflicts remain between opposing validity indications with equal certainty, an alert may be provided to a user with a corresponding explanation of the conflicting attributes. The user may then remediate the conflict.

Attribute conflicts may arise when two attribute values are incompatible according to a specific domain and at least one assignment has a certainty level of True. For example, in building automation networks, a device cannot be assigned both the role "BMS" (Building Management System) and the role "Controller" or both "IT Device" and "OT Device." Such exclusions can be encoded as a list of incompatible attribute pairs. In some embodiments, the logical reasoning module may detect the conflicts by iterating through all possible conflicting assignment pairs to determine whether the assigned attributes are included in the incompatibility list. All assignments except the most certain will be discarded and an alert may be provided to the user if there are any conflicts remaining.

In some embodiments, the logical reasoning module can provide explanations about each attribute assignment to allow users to understand classification results or the causes of raised conflict alerts. In some embodiments, the explanation may be a derivation tree representing the heuristic rules that contributed to the assignment, the evidence (e.g., device information) that triggered the rules, and any other contextual information associated with the attribute assignment. In some embodiments, the information provided in the explanations may be provided in plain language, such as a sentence or paragraph describing the result.

Accordingly, described herein in various implementations are systems, methods, techniques, and related technologies, which may assign device attributes, perform classifications, or a combination thereof. As described herein, various techniques can be used to perform device attribute designation and device classification, as well as network segmentation and risk management.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which an entity can access or communicate with. Segmentation or "zoning" can provide effective controls to limit movement across the network (e.g., by a hacker or malicious software). Enforcement points including firewalls, routers, switches, cloud infrastructure, other network devices/entities, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its entities and the amount of work or labor involved in configuring network entities.

Although embodiments are described herein with reference to network devices, embodiments also apply to any entity communicatively coupled to the network. An entity or entities, as discussed herein, include devices (e.g., computer systems, for instance laptops, desktops, servers, mobile devices, IoT devices, OT devices, etc.), endpoints, virtual machines, services, serverless services (e.g., cloud-based services), containers (e.g., user-space instances that work with an operating system featuring a kernel that allows the existence of multiple isolated user-space instances), cloud-based storage, accounts, and users. Depending on the entity, an entity may have an IP address (e.g., a device) or may be without an IP address (e.g., a serverless service).

The enforcement points may be one or more network entities (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any entity that is capable of filtering, controlling, restricting, or the like communication or access on a network.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122A-B. The devices 120 and 130 and network coupled devices 122A-B may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices/entities of communication network 100 may communicate in a variety of ways including wired and wireless connections and may use one or more of a variety of protocols.

Network device 104 may be one or more network entities configured to facilitate communication among aggregation device 106, system 150, network monitor entity 102, devices 120 and 130, and network coupled devices 122A-B. Network device 104 may be one or more network switches, access points, routers, firewalls, hubs, etc.

Network monitor entity 102 may be operable for a variety of tasks including performing device classification and attribute designation with associated belief values, as described herein. Network monitor entity 102 may perform device classification based on one or more devices coupled to network device 104 by applying a set of heuristic rules, which include certainty associated with each rule, on device features (e.g., evidence) to classify devices and assign device attributes. Network monitor entity 102 may further generate an explanation of the device classifications or provide alerts for classifications from heuristic rules that are conflicting. The network monitor entity 102 may address the conflicts based on the belief values associated with each of the conflicting classifications. In some embodiments, network monitor entity 102 can use local resources (e.g., processing, memory, data resources, or other resources), cloud resources, or a combination thereof for performing the device classification and attribute designation based on heuristic rules (e.g., logic programming).

Network monitor entity 102 can determine one or more enforcement points where the entity is communicatively coupled to the network and thereby determine the one or more enforcement points closest to the entity. For example, network monitor entity 102 may access information on a switch (e.g., a switch cache) to determine a port (e.g., physical port, wireless port, or virtual port) where an entity with a particular IP address or MAC address or other identifier is communicatively coupled. Network monitor entity 102 may also access information from a wireless access point where the entity is communicatively coupled. In some embodiments, network monitor entity 102 may poll information from a cloud service to determine where an entity is communicatively coupled or connected to a network. In various embodiments, network monitor entity 102 may access syslog or SNMP information from an entity itself to determine where an entity is communicatively coupled or connected to a network (e.g., without accessing information from a network entity or enforcement point). Network monitor entity 102 supports applying access policies in situations where an entity is communicatively coupled to a network with more than one connection (e.g., a wired connection and a wireless connection).

Based on the enforcement point, network monitor entity 102 may determine the one or more access rules to be assigned to the one or more enforcement points based on an access policy. In some embodiments, based on information about the one or more enforcement points closest to the entity, network monitor entity 102 translates the access policy into one or more commands that will be used to configure the access rules on the one or more enforcement points. The closest enforcement point to an entity may be an enforcement point where the entity is communicatively coupled. The enforcement point may be network entity or network infrastructure device closest in proximity (e.g., physical proximity) to the entity. The enforcement point comprises the port where the entity is communitive coupled to the network, and communication to and from the entity is sent first through that port. In some embodiments, the port of the enforcement point is the last point of communication within network infrastructure before communication is sent to the entity. In various embodiments, the closest enforcement point is where communication from the entity is initially sent when communications are sent from the entity (e.g., prior to communications with the network backbone or Internet backbone). For example, the closest enforcement to an entity connected to a switch is the switch. As another example, the closest enforcement point to an entity wirelessly communicatively coupled to a wireless access point is wireless access point. In various embodiments, network monitor entity 102 may access the current configuration of the one or more enforcement points to determine the access rules (e.g., ACLs) that are to be applied to the one or more enforcement points, as described herein. In some embodiments, an entity is communicatively coupled to a wireless controller via a wireless access point and the wireless controller or a switch is the closest enforcement point (e.g., based on the wireless controller or the switch being able to apply access rules, for instance ACLs, to communications of the entity, for instance, in the case where the wireless access point is not able to or does not have the functionality to apply access rules). In various embodiments, an entity is communicatively coupled to a layer 3 switch via a layer 2 switch and the layer 3 switch is the closest enforcement point (e.g., based on the layer 3 switch being able to apply access rules, for instance ACLs, to communications of the entity, for instance, in the case where the layer 2 switch is not able to or does not have the functionality to apply access rules).

Network monitor entity 102 may then apply or assign the access rules to the one or more enforcement points closest to the entity. Network monitor entity 102 may communicate the access rules via application programming interfaces (APIs), command line interface (CLI) commands, Web interface, simple network management protocol (SNMP) interface, etc. In some embodiments, network monitor entity 102 may verify that the one or more enforcement points have been properly or correctly configured based on the access rules.

Network monitor entity 102 may provide an interface (e.g., a graphical user interface (GUI)) for defining heuristic rules, with belief values, to be applied to device features for device classification. The interface may further allow viewing monitoring device classifications and classification explanations, as described herein. The network monitor entity 102 may further provide an interface for a user to view alerts or indications of classification conflicts and options to remediate the conflicts (e.g., allowing selection of one of the conflicting classifications).

Network monitor entity 102 may further perform a variety of operations including identification, classification, and taking one or more remediation actions (e.g., changing network access of an entity, changing the virtual local area network (VLAN), sending an email, sending a short message service (SMS) message, etc.).

In some embodiments, an enforcement point may be a router, firewall, switch, hypervisor, software-defined networking (SDN) controller, virtual firewall, or other network entity or infrastructure that may have an ACL like or rule like policy or functionality to apply based on the port where an entity is communicatively coupled thereto. Enforcements points may also be a next generation firewall (NGFW) and cloud infrastructure. A NGFW can be updated with an ACL like policy regarding an entity accessing the Internet. Cloud infrastructure (e.g., amazon web services (AWS) security groups) can be updated to drop packets from the IP of the entity that have a destination outside the cloud. Embodiments are operable to configure enforcement points at the edge of a network where an entity is communicatively coupled thereto thereby controlling access of the device on a customized basis (e.g., customized or tailored for the entity).

In some embodiments, if the categorization or characteristics functionality is being updated (e.g., which could result in a change in one or more access rules that are assigned to an enforcement point closest an entity and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After confirmation, the access rules may be changed.

Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, web interface, SNMP, etc.), which are described further herein. Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or 3r d party systems (e.g., system 150) may further be used for determining one or more tags or characteristics for an entity. For example, a vulnerability assessment (VA) system may be queried to verify or check if an entity is in compliance and provide that information to network monitor entity 102.

External or 3rd party systems may also be used to perform a scan or a check on an entity to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122A-B. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122A-B on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to an entity being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network entities (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other entities (e.g., ZigBee', Bluetooth, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122A-B and provide network access to network coupled devices 122A-B. Aggregation device 106 may further be configured to provide information (e.g., operating system, device software information, device software versions, device names, application present, running, or both, vulnerabilities, patch level, etc.) to network monitor entity 102 about the network coupled devices 122A-B. Aggregation device 106 may be a wireless access point that is configured to communicate with a wide variety of entities through multiple technology standards or protocols including, but not limited to, Bluetooth, ZigBee', Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122A-B via a wireless connection. Aggregation device 106 may be configured to communicate with network coupled devices 122A-B using a standard protocol with proprietary extensions or modifications.

Aggregation device 106 may further provide log information of activity and attributes of network coupled devices 122A-B to network monitor entity 102. It is appreciated that log information may be particularly reliable for stable network environments (e.g., where the types of entities on the network do not change often). The log information may include information of updates of software of network coupled devices 122A-B.

Figure 2:
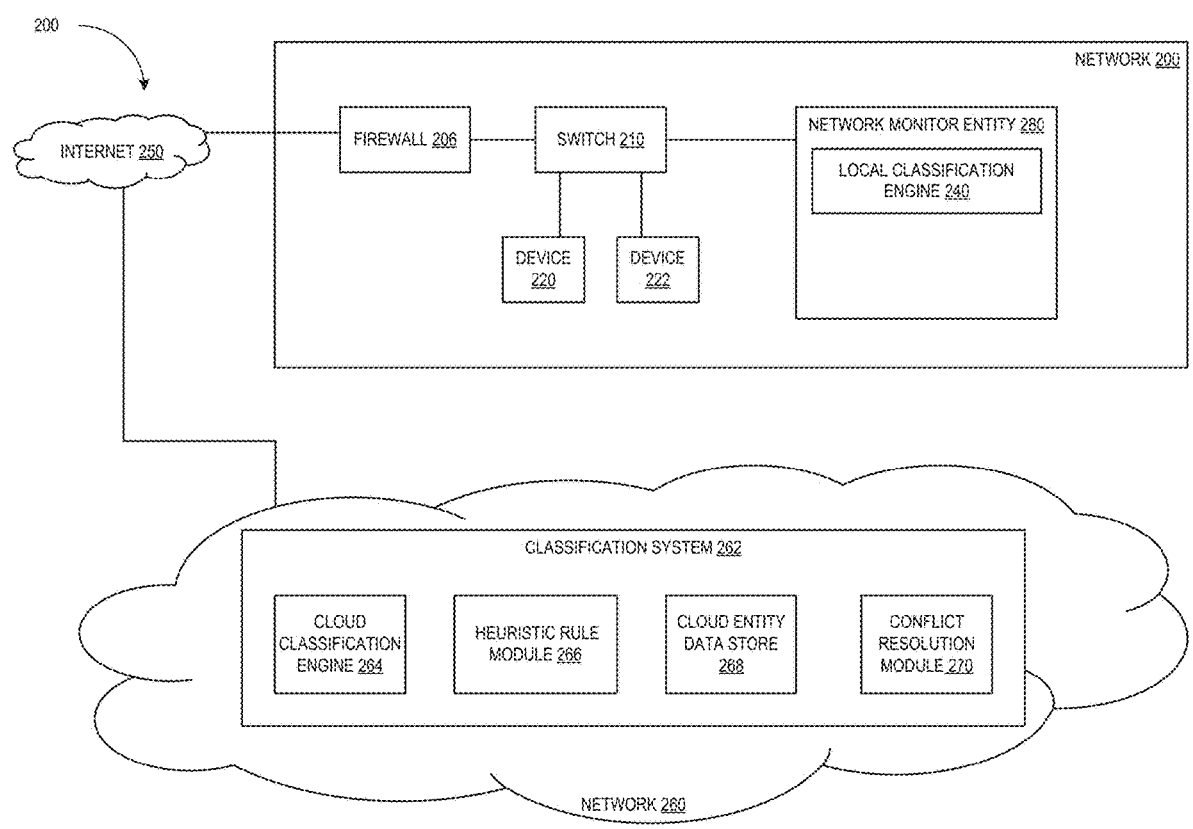
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewall 206 and switch 210) and a network monitor entity 280 (e.g., network monitor entity 102) which can perform device classification using logic programming, such as heuristic rules with associated uncertainties, and provide explanations of resulting classifications, as described herein, associated with the various entities communicatively coupled in example network 200.

Classification system 262 may be a cloud classification system operable to perform device classification using logic programming, such as heuristic rules with associated uncertainties, and provide explanations of resulting classifications, as described herein. In some embodiments, classification system 262 may be part of a larger system operable to perform a variety of functions, e.g., part of a cloud-based network monitor entity, security device, etc. Example components are shown of network monitor entity 280 and classification system 262 and other components may be present or included.

FIG. 2 shows example devices 220-222 (e.g., devices 106, 122A-B, 120, and 130, other physical or virtual devices, other entities, etc.) and it is appreciated that more or fewer network entities or other entities may be used in place of the devices of FIG. 2. Example devices 220-222 may be any of a variety of devices or entities (e.g., smart devices, multimedia devices, networking devices, accessories, mobile devices, IoT devices, retail devices, healthcare devices, etc.), as described herein. Enforcement points including firewall 206 and switch 210 may be any device (e.g., network device 104, cloud infrastructure, etc.) that is operable to allow traffic to pass, drop packets, restrict traffic, etc. Network monitor entity 280 may be any of a variety of network devices or entities, e.g., router, firewall, an access point, network access control (NAC) device, intrusion prevention system (IPS), intrusion detection system (IDS), deception device, cloud-based entity or device, virtual machine based system, etc. Network monitor entity 280 may be substantially similar to network monitor entity 102. Embodiments support IPv4, IPv6, and other addressing schemes. In some embodiments, network monitor entity 280 may be communicatively coupled with firewall 206 and switch 210 through additional individual connections (e.g., to receive or monitor network traffic through firewall 206 and switch 210).

Switch 210 communicatively couples the various entities of network 200 including firewall 206, network monitor entity 280, and devices 220-222. Firewall 206 may perform network address translation (NAT). Firewall 206 communicatively couples network 200 to Internet 250 and firewall 206 may restrict or allow access to Internet 250 based on particular rules or ACLs configured on firewall 206. Firewall 206 and switch 210 are enforcement points, as described herein.

Network monitor entity 280 can access network traffic from network 200 (e.g., via port mirroring or SPAN ports of firewall 206 and switch 210 or other methods). Network monitor entity 280 can perform passive scanning of network traffic by observing and accessing portions of packets from the network traffic of network 200. Network monitor entity 280 may perform an active scan of an entity of network 200 by sending one or more requests to the entity of network 200. The information from passive and active scans of entities of network 200 can be used to determine one or more features associated with the entities of network 200 (e.g., evidence).

Network monitor entity 280 includes local classification engine 240 which may perform classification of the entities of network 200 including firewall 206, switch 210, and devices 220-222. Local classification engine 240 may designate attributes and classify one or more entities of network 200 based on one or more heuristic rules (e.g., from heuristic rule module 266) and provide belief values associated with outputs of the heuristic rules.

Local classification engine 240 can send data (e.g., attribute values) about entities of network 200, as determined by local classification engine 240, to classification system 262. Local classification engine 240 may encode and encrypt the data prior to sending the data to classification system 262. Local classification engine 240 may receive a classification from classification system 262 which network monitor entity 280 can use to perform various security related measures. In some embodiments, classification of an entity may be performed in part by local network monitor entity 280 (e.g., local classification engine 240) and in part by classification system 262.

Classification system 262 can perform cloud-based classification of devices based on heuristic rules and belief values for outputs of the heuristic rules, as described herein. In some embodiments, classification system 262 includes cloud classification engine 264, heuristic rule module 266, cloud entity data store 268, and conflict resolution module 270.

Cloud classification engine 264 may apply one or more heuristic rules from heuristic rule module 266 to obtain possible device attributes and roles (e.g., classifications) with associated belief values, as described herein. Cloud classification engine 264 may unencrypt and decode the information received prior to performing a classification. Cloud classification engine 264 may compare a collection of evidence associated with a device to one or more heuristic rules from heuristic rule module 266. Each of the heuristic rules may include one or more predicates (e.g., features that must be included for the rule to be triggered) and a belief value. If each of the predicates of a rule are met then the rule may provide an output predicate (e.g., the attribute that the rule assigns) and a belief value. The cloud classification engine 264 may further identify, using the conflict resolution module 270, whether any of the output predicates of the triggered rules include conflicting values or belief values. The conflict resolution module 270 may use the belief values of each of the output predicts to resolve the conflicts between the outputs, as described in more detail below with respect to FIGS. 3-7.

Heuristic rule module 266 may include each of the heuristic rules to be applied to the evidence associated with devices of the network to classify the devices. Cloud profile data store 266 is not subject to the resource conditions or limitations (e.g., processing power, storage, etc.) that may impact network monitor entity 280 (e.g., and local classification engine 240). Cloud entity data store 268 is a data store (e.g., a cloud entity database) of entity information that has been uploaded to classification system 262. For example, the data in cloud entity data store 268 may include all the evidence associated with an entity, such as entity or device name, operating system, function, vendor/model, and host information from a variety of networks (e.g., that have network monitor entities configured to upload device information).

With reference to FIGS. 3-6, flowcharts 300 and 500-600 illustrate example operations used by various embodiments. Although specific operation blocks ("blocks") are disclosed in flowcharts 300 and 500-600, such blocks are examples.

That is, embodiments are well suited to performing various other blocks or variations of the blocks recited in flowcharts 300 and 500-600. It is appreciated that the blocks in flowcharts 300 and 500-600 may be performed in an order different than presented, and that not all of the blocks in flowcharts 300 and 500-600 may be performed. The blocks of flowcharts 300 and 500-600 may be performed locally by an entity, in a cloud, or a combination thereof.

Figure 3:
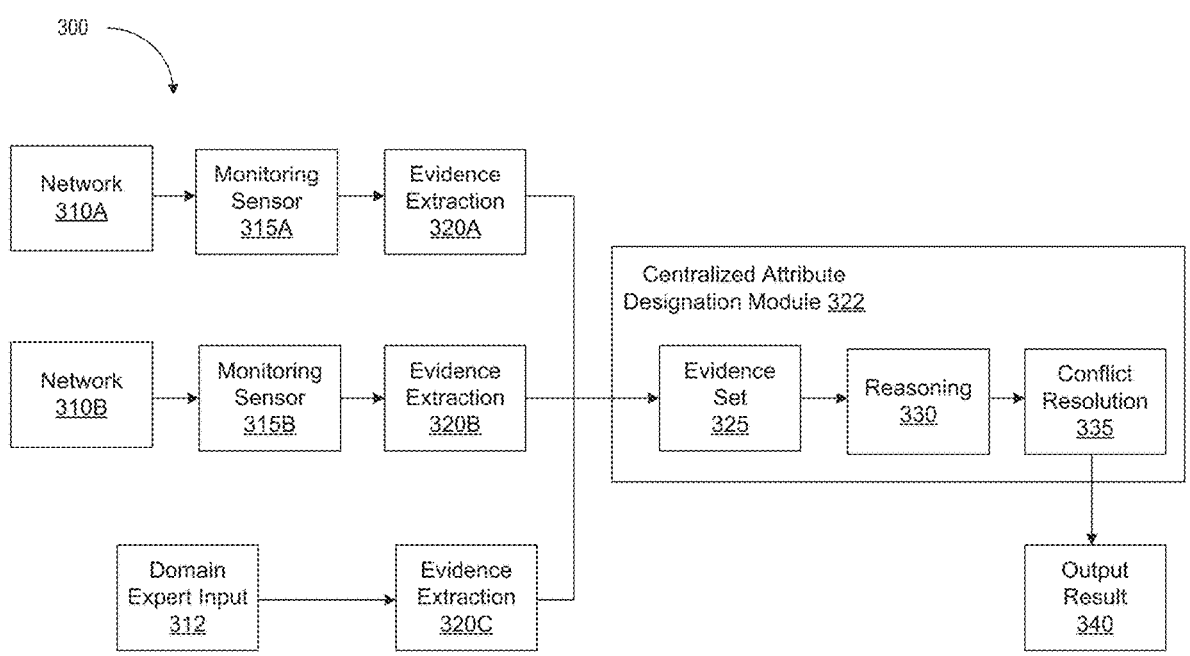
FIG. 3 depicts a system diagram illustrating a process for device attribute assignment based on logic programming, according to embodiments of the present disclosure.

FIG. 3 depicts a flow diagram illustrating a high-level process 300 for device classification based on logic programming, according to embodiments of the present disclosure. Various portions of process 300 may be performed by different components (e.g., components of system 800) of an entity or device (e.g., network monitor entity 102 or network monitor entity 280). Although specific components are depicted in FIG. 3, it should be appreciated that such components are examples. That is, embodiments are well suited to having various other components or variations of the components depicted in FIG. 3. It is appreciated that the components of FIG. 3 may operate with other components than those presented, and that not all of the components may be required to achieve the goals of the process 300 of the FIG. 3.

Monitoring sensors 315A-B may monitor networks 310A-B collecting data from network traffic of devices or entities connected to the corresponding networks 310A-B. Any number of networks may be monitored by local monitoring devices to collect device information from network traffic of the networks. The monitoring sensors 315A-B, or other processing device, may perform evidence extraction 320A-B based on the network traffic monitored by the monitoring sensors 315A-B. The evidence extracted from the network traffic may include features and characteristics of device communications, such as message type, host physical address, source and destination hosts, or any other information that may be extracted from message fields. Additionally, domain expert input 312 may be used to generate one or more heuristic rules for classifying devices and assigning device attributes. The domain expert input 312 may be used for further evidence extraction 320C and to generate evidence set 325 from the evidence extracted from each of the networks 310A-B. A centralized attribute designation module 322 may assign attributes and classify devices using the aggregated evidence set 325.

At block 330, processing logic (e.g., heuristic rule module 266) may apply reasoning (e.g., heuristic rules) to the evidence set for each device of the networks 310A-B monitored by monitoring sensors 315A-B. The heuristic rules may include a logical predicate indicating the features and feature values that must be present in the device evidence for the rule to be triggered. Each heuristic rule may be associated with an attribute value that may be assigned to a device if the rule is triggered. Additionally, each rule may include a belief value associated with the attribute value. For example, some rules may require fewer features or less reliable features to be triggered and therefore may have a lower belief value than rules that require more features or more reliable features. Reliability of features may be determined based on domain expert input.

In some embodiments, certain attributes may be structured in a hierarchy such that more specific attributes may also provide for assignment of broader attributes. For example, a device may be assigned the roles "Workstation" and "SCADA Workstation" and because the more specific latter is restricted to a unique vendor, then the vendor can also be assigned to the device. Thus, additional heuristic rules may be defined that propagate the attribute designation with a corresponding degree of belief. For example, if a first device is assigned a role attribute with belief of True (e.g., Role[id_1, "Controller", True]) then if the rule is hierarchical another attribute may also be assigned (e.g., Role[id_1, "OT Device", True).

At block 335, processing logic (e.g., conflict resolution module 270) performs conflict resolution for the rules that were triggered at block 330. In some examples, multiple heuristic rules may be triggered for a single device. However, due to the different belief values for the rules there may be rules that conflict with respect to the assigned attribute value (e.g., attribute conflicts) and with respect to the belief values (e.g., logical conflicts). To resolve logical conflicts, the processing logic may discard all attribute assignments except those with the lowest uncertainty. Any remaining logical conflict will involve assignments with opposing validity but equal uncertainty (e.g., True and False). For such conflicts where there is opposing validity with equal certainty, an alert may be provided to a user for further resolving the conflict. The processing logic may identify attribute conflicts based on a list of incompatible attribute pairs. For example, the processing logic may iterate through the potentially conflicting assigned attribute pairs to determine if there are any that are included in the list of incompatible attribute pairs. Similar to logical conflicts, the processing logic may discard each of the conflicting assignments except for the least uncertain (e.g., the most certain) assignments. If conflicts remain, the processing logic may provide an alert to the user of the conflicts.

After any conflicts are resolved at block 335, the processing logic may either assign an output result 340 to a device (e.g., a final classification of the device or final attribute designation). The output result 340 may also include an explanation of the final classification, attribute designation, or conflict alert. For example, the processing logic may provide a derivation tree including each of the triggered rules with the required predicates of the rules, the output of the rules, and the associated certainty level.

Figure 4:
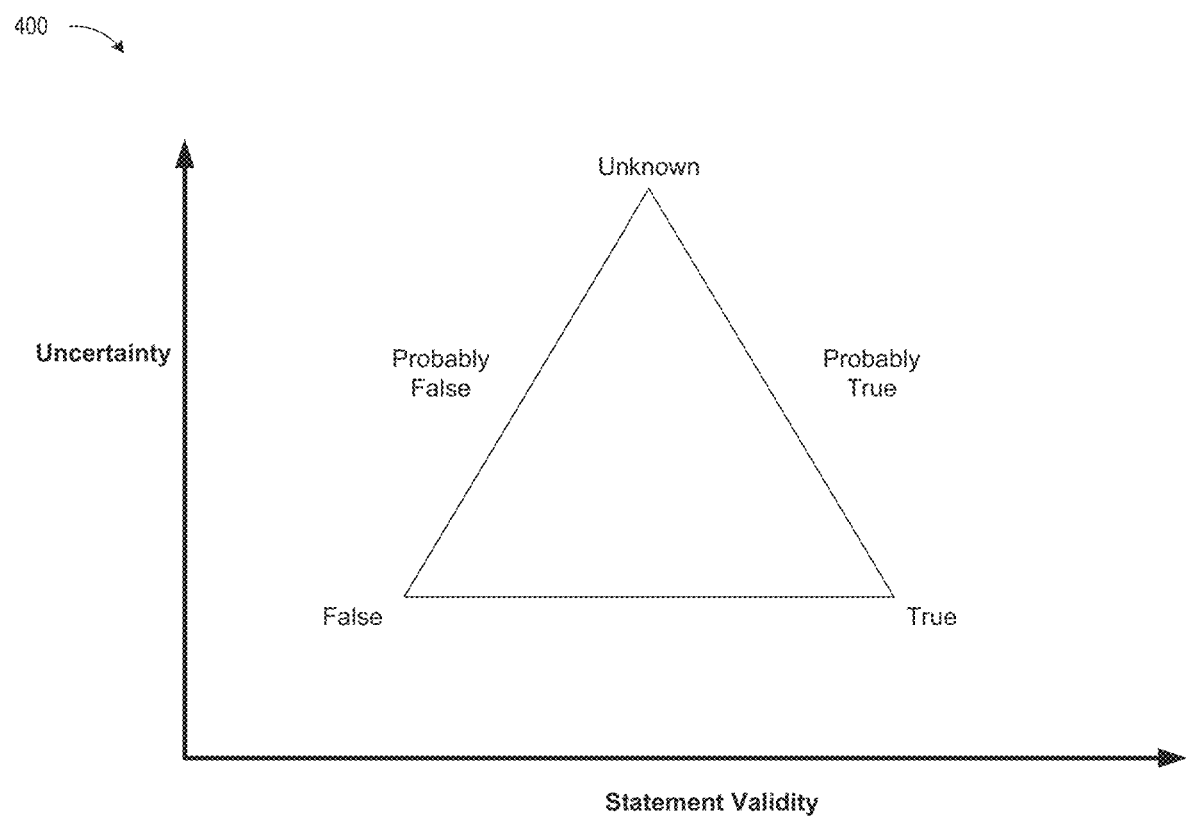
FIG. 4 depicts a diagram of an example belief space according to embodiments of the present disclosure.

FIG. 4 depicts a belief diagram 400 illustrating the relationship between statement certainty/uncertainty and statement validity. As discussed above, each rule produces an output predicate including the assigned attribute value and the certainty (or belief value). As depicted in FIG. 4, the possible belief values may include True, Probably True, Unknown, Probably False, and False. Unknown may be the default value when a heuristic has maximum uncertainty about the attribute being assigned (e.g., when there is incomplete or no evidence for the attribute). The values Probably True or Probably False may be used when the heuristic has partial confidence about the value the attribute has or does not have (e.g., when the heuristic deals with ambiguous evidence or operates in domains of intrinsic uncertainty). The values of True and False may be reserved for heuristics with strong confidence about the value of assigned attribute values. As can be seen in FIG. 4, the values of False and True each have the same uncertainty but have opposite statement validity. The same is true for Probably False and Probably True.

Figure 5:
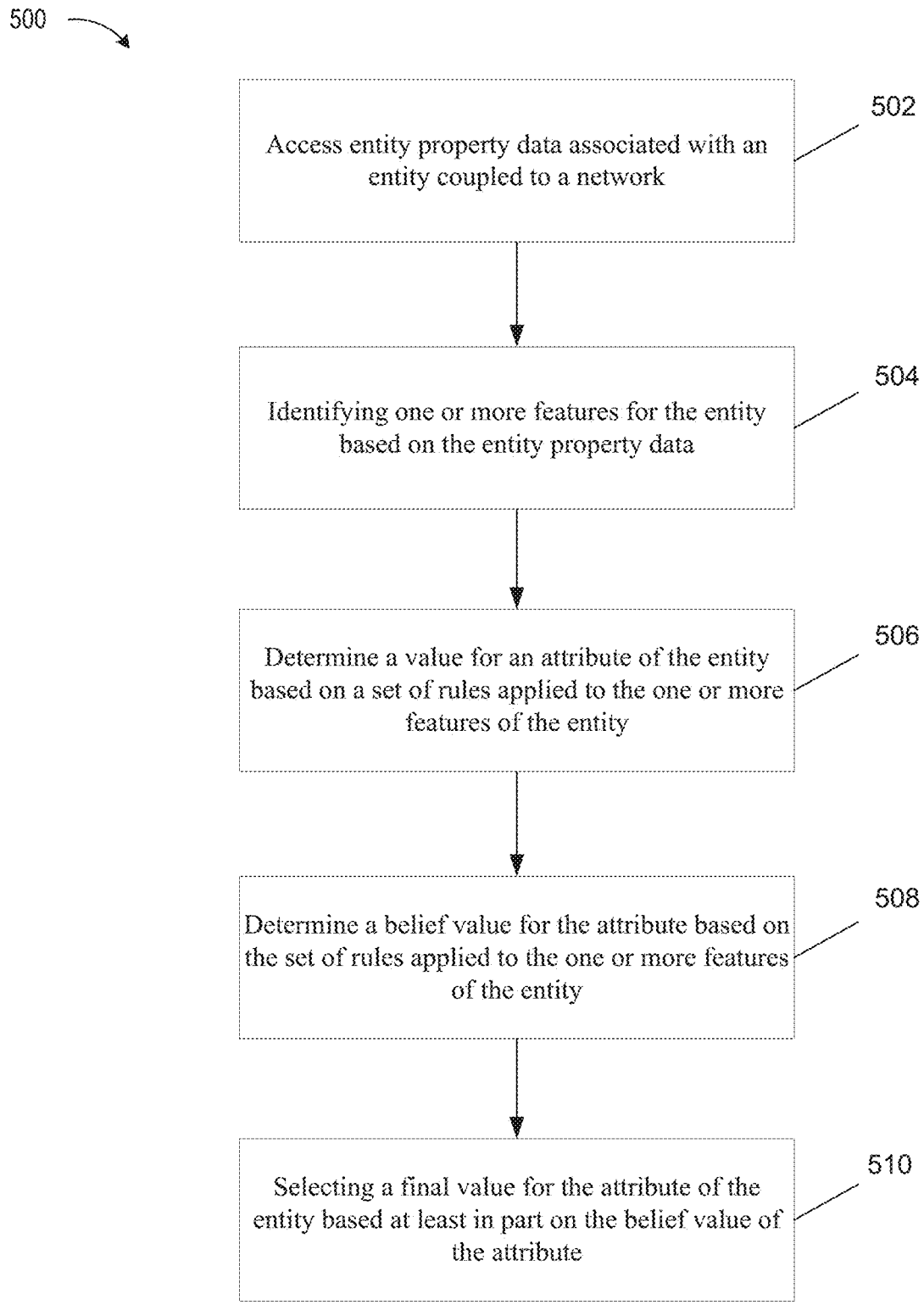
FIG. 5 depicts a flow diagram illustrating a process for device attribute assignment based on logic programming according to embodiments of the present disclosure.

FIG. 5 depicts a flow diagram of aspects of process 500 for device classification and attribute assignment based on logical reasoning in accordance with one implementation of the present disclosure. Various portions of process 500 may be performed by different components (e.g., components of system 800) of an entity or device (e.g., network monitor entity 102 or network monitor entity 280). Process 500 begins at block 502, where processing logic (e.g., network monitor entity 102, network monitor entity 280, network monitor entities 315A-B) accesses device property data associated with a device coupled to a network. Accessing device property data may include monitoring network traffic associated with the device on the network (e.g., via passive monitoring, active monitoring, or a combination thereof). The processing logic may store the device property data from the network traffic locally at a monitoring device or provide the device property data to a central location, such as a cloud classification system as described with respect to FIG. 2.

At block 504, the processing logic (e.g., classification system 262) identifies one or more features for the device based on the device property data. This block may correspond to evidence extraction as described with respect to FIG. 3. Some features identified from the device property data may include required features and values that may be used to identify a device. Additional features may be optional and may include descriptive properties of the identified device. The values for such additional or optional features may sometimes be unavailable due to limited time sampling of network traffic, due to a limited view of the network of the device, etc. The values of such features may be assigned a value of "None" for example. In some examples, the additional features may be collected via passive monitoring by a monitoring device that is local to the monitored network. The monitoring device may perform evidence extraction from the network traffic one network message at a time. The monitoring device may assign a global ID to the device on the network based on the network and a device's network IP address. The monitoring device may determine the top layer network protocol used by the message from the device. The monitoring device may then extract features of the device from the message, and future messages, based on the protocol used by the device. For example, the monitoring device may extract potentially relevant optional features from the message fields, such as message type, host physical address, etc. The extracted evidence may be represented as a combination of features and features values from the message. The monitoring device may transmit the evidence extracted from several messages to a centralized evidence set for multiple monitored networks.

At block 506, the processing logic (e.g., heuristic rule module 266) determines a value for an attribute of the device based on a set of rules applied to the one or more features of the device. In some embodiments, the set of rules may be heuristic rules. The heuristic rules may be encoded into core predicates and additional predicates. The core predicates may include the required features that identify a device, which are necessary to be able to determine which device is being classified, or assigned a feature. Additional predicates may be added to rules to assign an attribute, or classify a device, if the extracted features of the device match the additional predicates. In particular, each rule may evaluate (e.g., be triggered) if a combination of features related to the device matches, or does not match, some known indicators for an attribute. If the combination of features match, then the attribute is assigned to the device. For example, a rule might check if the values of the required Protocol and the optional feature DstPort are "DHCP" and "68" respectively. In such a case, a "DHCP Server" role attribute value may be assigned to the destination device.

At block 508, processing logic (e.g., heuristic rule module 266) determines a belief value for the attribute based on the set of rules applied to the one or more features of the device. For example, along with each attribute assignment, the processing logic may also produce a context of the assignment in the form of a belief value that represents both the uncertainty and the truth value associated with the heuristic outcome, as described above with respect to FIG. 4. Thus, each rule may produce an output assignment of an attribute including an identifier of the device, the value of the attribute, and the belief value (e.g., attribute[DeviceID, Attribute Value, Belief]).

At block 510, processing logic (e.g., heuristic rule module 266, conflict resolution module 270 or a combination thereof) selects a final value for the attribute of the device based at least in part on the belief value of the attribute. For example, multiple rules may have assigned incompatible attribute values or the same attribute values with different belief values as a result of multiple heuristics being triggered due to the device's behavior. Therefore, the processing logic may resolve such conflicts prior to assigning a final attribute value to the device. To resolve logical conflicts, the processing logic may first attempt an automatic resolution by discarding all assignments except those with the lowest uncertainty (e.g., highest certainty). Remaining logical conflicts will therefore include assignments with opposing validity but equal certainty. In such a case, an alert indicating the conflict may be provided to a user along with an explanation of the conflicting attributes. Similarly, attribute conflicts may be resolved by discarding all assignments except the most certain ones and then raising an alert if conflicts still exist. As described in more detail below with respect to FIG. 7, the processing logic may generate an explanation of each attribute assignment or attribute conflicts to be provided to a user. The explanation may support the user's understanding of the causes of raised alerts and in auditing attribute assignments. The user may then be able to resolve the conflict. For example, the user may select which of the conflicting attribute assignments to assign to the device or network entity.

Figure 6:
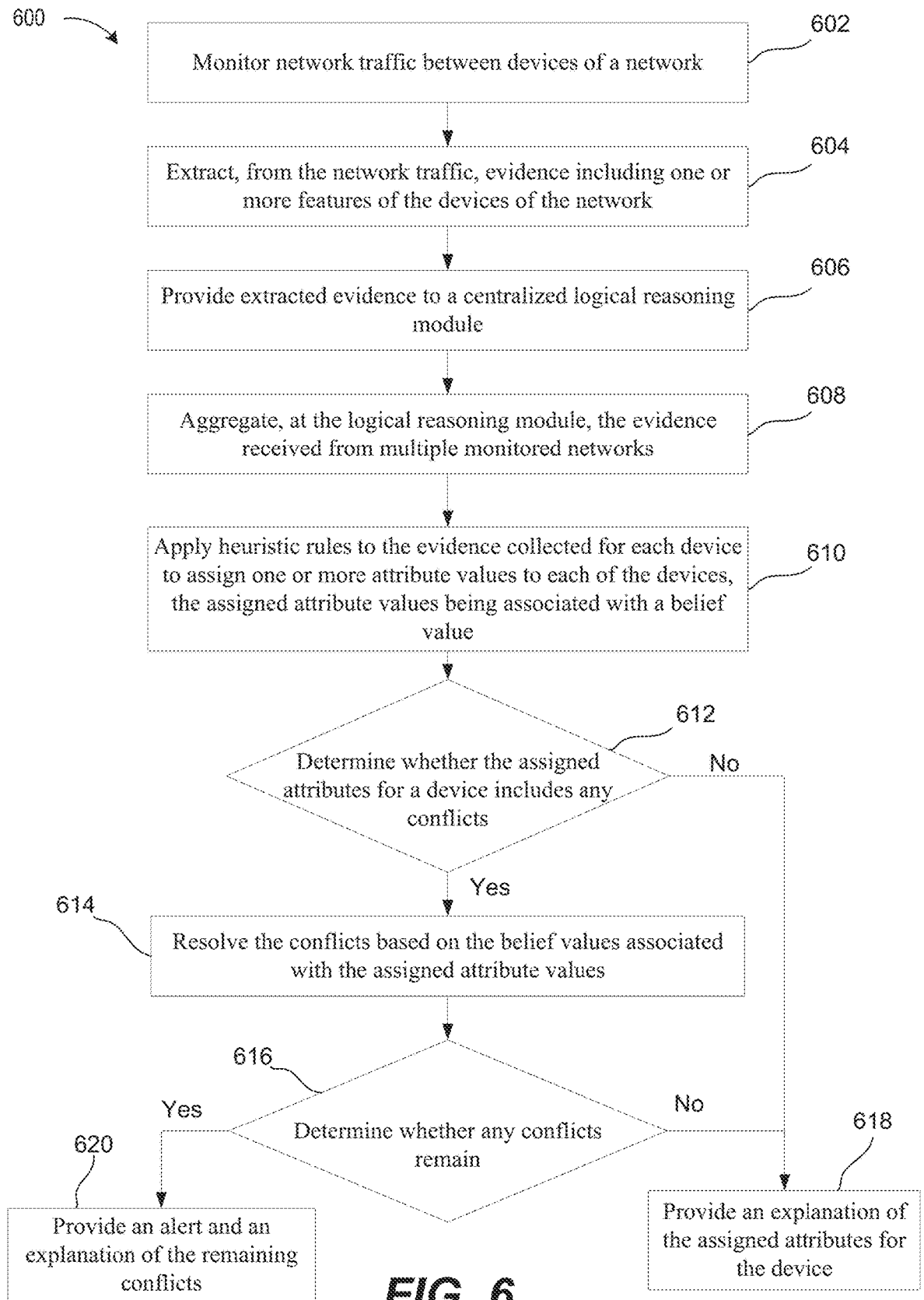
FIG. 6 depicts a flow diagram illustrating another process for device attribute assignment based on logic programming according to embodiments of the present disclosure.

FIG. 6 depicts a flow diagram of aspects of process 600 for device classification and attribute assignment based on logical reasoning in accordance with one implementation of the present disclosure. Various portions of process 600 may be performed by different components (e.g., components of system 800) of an entity or device (e.g., network monitor entity 102 or network monitor entity 280). Process 600 begins at block 602, where processing logic (e.g., network monitor entity 102 or network monitor entity 280) monitors network traffic between devices of a network, as described herein. At block 604, the processing logic extracts, from the network traffic, evidence including one or more features of the devices of the network, as described herein.

At block 606, the processing logic provides the evidence extracted to a centralized logical reasoning module, as described herein. At block 608, processing logic (e.g., classification system 262) aggregates, at the logical reasoning module, the evidence received from multiple monitored networks. At block 610, processing logic (e.g., heuristic rule module 266) applies rules (e.g., heuristic rules) to the evidence collected for each device to assign one or more attribute values to each of the devices, the assigned attribute values being associated with a belief value, as described herein. At block 612, processing logic (e.g., conflict resolution module 270) determines whether the assigned attributes for a device includes one or more conflicts, as described herein. In response to determining that there are no conflicts, the process continues to block 618 where the processing logic provides an explanation of the assigned attributes for a device, as described herein.

In response to determining that there are one or more conflicts at block 612, the process proceeds to block 614 where processing logic resolves one or more conflicts based on the belief values associated with the assigned attribute values, as described herein. At block 616, the processing logic determines whether there are any conflicts that remain after conflict resolution is performed at block 614, as described herein. If no conflicts remain, the process proceeds to block 618 where the processing logic provides an explanation of the assigned attributes for the device, as described herein. If any conflicts remain after conflict resolution, the process continues to block 620, where processing logic provides an alert and an explanation of the remaining conflicts, as described herein.

FIG. 7 depicts an example attribute assignment or conflict explanation 700 according to some embodiments. To support a user's understanding of the causes of raised conflict alerts and in auditing attribute assignments, the reasoning module (e.g., centralized attribute designation module 322 of FIG. 3) may generate an explanation about why each assignment was made. The explanation may take the form of a derivation tree, as depicted in FIG. 7. The explanation may also take other forms, such as a natural language explanation. The explanation may include the path of rules that were involved in the assignment along with gathered evidence that triggered those rules. Other contextual information may also be provided such as the first and last time the evidence was observed, the amount of times it has been observed, etc. As an example, the derivation tree depicted by FIG. 7 represents an explanation for a role assignment of "BMS" (Building Management System) to a device (or entity) with an IP address of "10.5.8.160" with a belief value of TRUE. The assignment is derived from three pieces of evidence: 1) a message from "10.5.0.138" to "10.5.8.160" using protocol "BACnet", 2) the same message has a BACnet Network Protocol Data Unit (NPDU), and 3) the message is of the specific type "Simple_ACK_Confirmed_Event_Notification". Additionally, the derivation tree of FIG. 7 further indicates that there is no conflict (e.g., !conflict) with the device being assigned the role "BMS".

Figure 8:
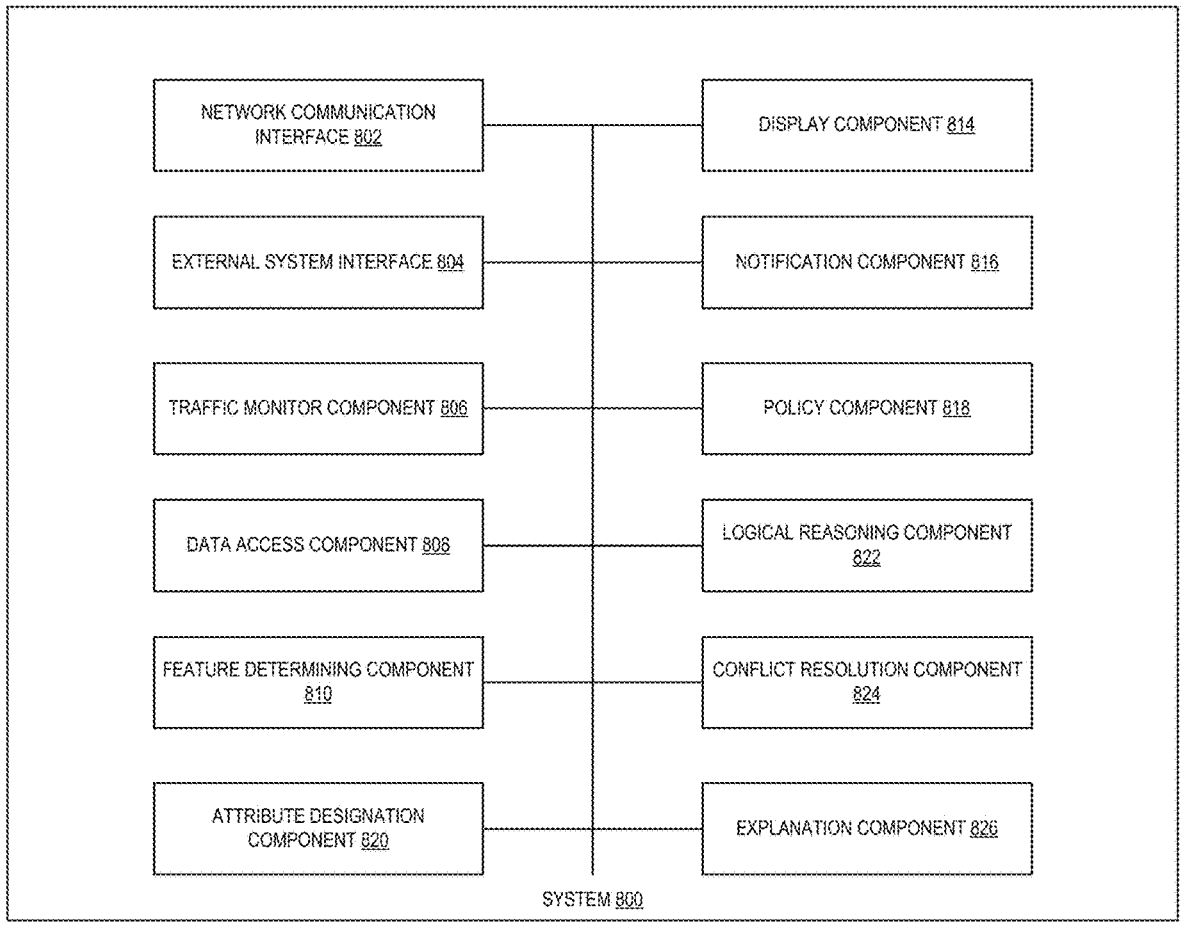
FIG. 8 depicts illustrative components of a system for device attribute assignment based on logic programming in accordance with one implementation of the present disclosure.

FIG. 8 illustrates example components used by various embodiments. Although specific components are disclosed in system 800, it should be appreciated that such components are examples. That is, embodiments are well suited to having various other components or variations of the components recited in system 800. It is appreciated that the components in system 800 may operate with other components than those presented, and that not all of the components of system 800 may be required to achieve the goals of system 800.

FIG. 8 depicts illustrative components of a system for device attribute designation and classification using heuristics with associated belief values in accordance with one implementation of the present disclosure. Example system 800 or classifier 800 includes a network communication interface 802, an external system interface 804, a traffic monitor component 806, a data access component 808, a feature determination component 810, a display component 814, a notification component 816, a policy component 818, an attribute designation component 820, logical reasoning component 822, a conflict resolution component 824, and an explanation component 826. The components of system 800 may be part of a computing system or other electronic device (e.g., network monitor entity 102 or network monitor entity 280) or a virtual machine or device and be operable to monitor and one or more entities communicatively coupled to a network, monitor network traffic, determine one or more classifications of an entity, perform one or more actions, as described herein. For example, the system 800 may further include a memory and a processing device, operatively coupled to the memory, which may perform the operations of or execute the components of system 800. The components of system 800 may access various data and characteristics or features associated with an entity (e.g., network communication information) and data associated with one or more entities. It is appreciated that the modular nature of system 800 may allow the components to be independent and allow flexibility to enable or disable individual components or to extend, upgrade, or combination thereof components without affecting other components thereby providing scalability and extensibility. System 800 may perform one or more blocks of flow diagrams 300 and 500-600. In some embodiments the components of 800 may be part of network monitor device (e.g., network monitor entities 102 and 280), in the cloud, or the various components may be distributed between local and cloud resources.

Communication interface 802 is operable to communicate with one or more entities (e.g., network device 104, firewall 206, switch 210, other entities coupled thereto, devices 220-222, etc.) coupled to a network that are coupled to system 800 and receive or access information about entities (e.g., device information, device communications, device characteristics, features, etc.), access information as part of a passive scan, send one or more requests as part of an active scan, receive active scan results or responses (e.g., responses to requests), as described herein. The communication interface 802 may be operable to work with one or more components to initiate access to characteristics or determination of characteristics of an entity to allow determination of one or more features which may then be used for device compliance, asset management, standards compliance, classification, identification, etc., as described herein. Communication interface 802 may be used to receive and store network traffic for determining features, as described herein.

External system interface 804 is operable to communicate with one or more third party, remote, or external systems to access information including characteristics or features of an entity (e.g., to be used to determine a security aspects). External system interface 804 may further store the accessed information in a data store. For example, external system interface 804 may access information from a vulnerability assessment (VA) system to enable determination of one or more compliance or risk characteristics associated with the entity. External system interface 804 may be operable to communicate with a vulnerability assessment (VA) system, an advanced threat detection (ATD) system, a mobile device management (MDM) system, a firewall (FW) system, a switch system, an access point (AP) system, etc. External system interface 804 may query a third party system using an API or CLI. For example, external system interface 804 may query a firewall or a switch for information (e.g., network session information) about an entity or for a list of entities that are communicatively coupled to the firewall or switch and communications associated therewith. In some embodiments, external system interface 804 may query a switch, a firewall, or other system for information of communications associated with an entity.

Traffic monitor component 806 is operable to monitor network traffic to determine if a new entity has joined the network or an entity has rejoined the network and monitor traffic for analysis by data access component 808, attribute designation component 820, and logical reasoning component 822, as described herein. Traffic monitor component 806 may have a packet engine operable to access packets of network traffic (e.g., passively) and analyze the network traffic. The traffic monitor component 806 may further be able to access and analyze traffic logs from one or more entities (e.g., network device 104, system 150, or aggregation device 106) or from an entity being monitored. The traffic monitor component 806 may further be able to access traffic analysis data associated with an entity being monitored, e.g., where the traffic analysis is performed by a third-party system.

Data access component 808 may be operable for accessing data including metadata associated with one or more network monitoring entities (e.g., network monitor entities 102 or 280-282), including features that the network monitoring entity is monitoring or collecting, software versions (e.g., of the profile library of the network monitoring entity), and the internal configuration of the network monitoring entity. The data accessed by data access component 808 may be used by embodiments to perform classification including ensuring that the most up to date models, profiles, and other classification information is being used (e.g., by an attribute designation component 820). Data access component 808 may further access vertical or environment data and other user associated data, including vertical, environment, common type of entities for the network or network portions, segments, areas with classification issues, etc., which may be used for classification.

Data access component 808 may access data associated with active or passive traffic analysis or scans or a combination thereof. Information accessed by data access component 808 may be stored, displayed, and used as a basis for attribute designation and device classification using logic programming with heuristic rules and associated belief values, as described herein.

Feature determination component 810 is configured to determine one or more features associated with an entity, as described herein. Feature determination component 810 may determine one or more features and associated values associated with an entity based on analysis (e.g., including extraction of features and values) of network traffic, as described herein. In some examples, a device attribute may be general attributes of a class or classes of devices while device features may be values associated with operation of individual devices, or entities. The features can then be stored and used by other components (e.g., attribute designation component 820 or logical reasoning component 822) device attribute designation and classification using heuristics with associated belief values, as described herein.

Attribute designation component 820 is configured to perform logical reasoning to assign attributes and perform a classification of devices based on heuristics with associated belief values and resolving any conflicts between assigned attributes based on certainties of the belief values, as described herein. Attribute designation component 820 may further use profile libraries, entity or device fingerprints, or other domain knowledge for heuristic rules, in conjunction or in place of classification using the one or more models, as described herein. Attribute designation component 820 may use local resources (e.g., local classification engine 240), cloud resources (e.g., classification system 262), or a combination thereof for determining a classification.

Logical reasoning component 822 may be configured to apply heuristics (e.g., heuristics defined using domain specific knowledge) to the device features extracted by feature determining component 810 to assign one or more device attributes to a device (e.g., role classification), as described herein. The logical reasoning component 822 may also provide, along with the result of triggered heuristics, a belief value indicating a certainty of each assigned attribute. For example, each heuristic may include an associated belief value based on the device features that trigger the heuristic.

Conflict resolution component 824 is configured to resolve one or more conflicts between any of the attributes assigned by the logical reasoning component 822, as described herein. For example, the conflict resolution component 824 may determine whether any conflicts exist between the assigned attribute values or between the belief values of an attribute and then discard attribute assignments with certainty values less than the assignment or assignments with the highest certainty. In other words, the logical reasoning component 822 selects only the attribute assignments with the highest level of certainty and discards the other assignments. If conflicts still remain, the conflict resolution component 824 may provide an alert to the user that a conflict exists to allow the user to take manual action for the attribute assignment.

Explanation component 826 is configured to generate an explanation of either the resulting automatic attribute assignment or the attribute conflicts, as described herein. For example, the explanation component 826 may generate a derivation tree, e.g., a plain language explanation, or any other format indicating the features and heuristic rules that resulted in the attribute assignment or conflict along with the belief and certainty associated with each. Thus, the explanation may indicate which rules were triggered and why they were triggered (e.g., which device features were present in the evidence to trigger the rule).

Display component 814 is configured to optionally display one or more graphical user interfaces or other interfaces (e.g., command line interface) for depicting various information associated with entities, and entity classification and attribute assignment, as described herein. In some embodiments, display component 814 may display or render a network graph of entities including one or more device attributes or classifications, access rules associated with entities, other access rule information (e.g., access policies, access templates, etc.), or explanations of device attribute assignments or conflicts.

Notification component 816 is operable to initiate one or more notifications based on the results of one or more classifications and other analysis of communications, as described herein. The notification may be any of a variety of notifications, e.g., IT ticket, email, SMS, a HTTP notification, conflict alerts, etc., as described herein.

Policy component 818 is operable for initiating or triggering one or more remediation actions or security actions according to one or more policies, e.g., based on one or more classifications, as described herein. Policy component 818 may further be configured to perform other operations including checking compliance status, finding open ports, etc. In some embodiments, policy component 818 may verify that an assignment of one or more access rules to one or more enforcements points has been properly assigned or configured. Policy component 818 may restrict network access, signal a patch system or service, signal an update system or service, etc., as described herein. The policy component 818 may thus, among other things, invoke automatically (e.g., without user or human interaction) patching, automatically updating, and automatically restrict network access of an entity (e.g., that has out-of-date software or based on access rule violation or attempted violation).

The actions may include restricting network access to a particular level (e.g., full, limited, or no network access, for instance via an enforcement point), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 800 may be software stored on a non-transitory computer readable medium having instructions encoded thereon that, when executed by a processing device, cause the processing device to access device property data associated with a device coupled to a network; identify one or more features for the device based on the device property data; determine a first value for an attribute of the device based on a set of rules applied to the one or more features of the device; determine a first belief value for the attribute based on the set of rules applied to the one or more features of the device; and select a final value for the attribute of the device based at least in part on the first belief value for the first value of the attribute.

In some embodiments, the processing device is further to determine a second value for the attribute of the device based on the set of rules applied to the one or more features; and determine a second belief value for the second value of the attribute based on the set of rules. In some embodiments, to select the final value for the attribute the processing device is further to select the first value for the attribute or the second value for the attribute based on the first and second belief values. In some embodiments, to access device property data the processing device is to monitor network traffic associated with the device coupled to the network; and extract the one or more features for the device from the network traffic associated with the device.

In some embodiments, to determine the first value for the attribute the processing device is to apply a set of heuristic rules to the one or more features of the device, wherein each heuristic rule is triggered if a set of predicates of the heuristic rule matches with the one or more features of the device. In some embodiments, each heuristic rule has an associated belief value indicating a certainty and a validity of an attribute value assigned by the heuristic rule. In some embodiments, the attribute includes a role classification of the device.

Figure 9:
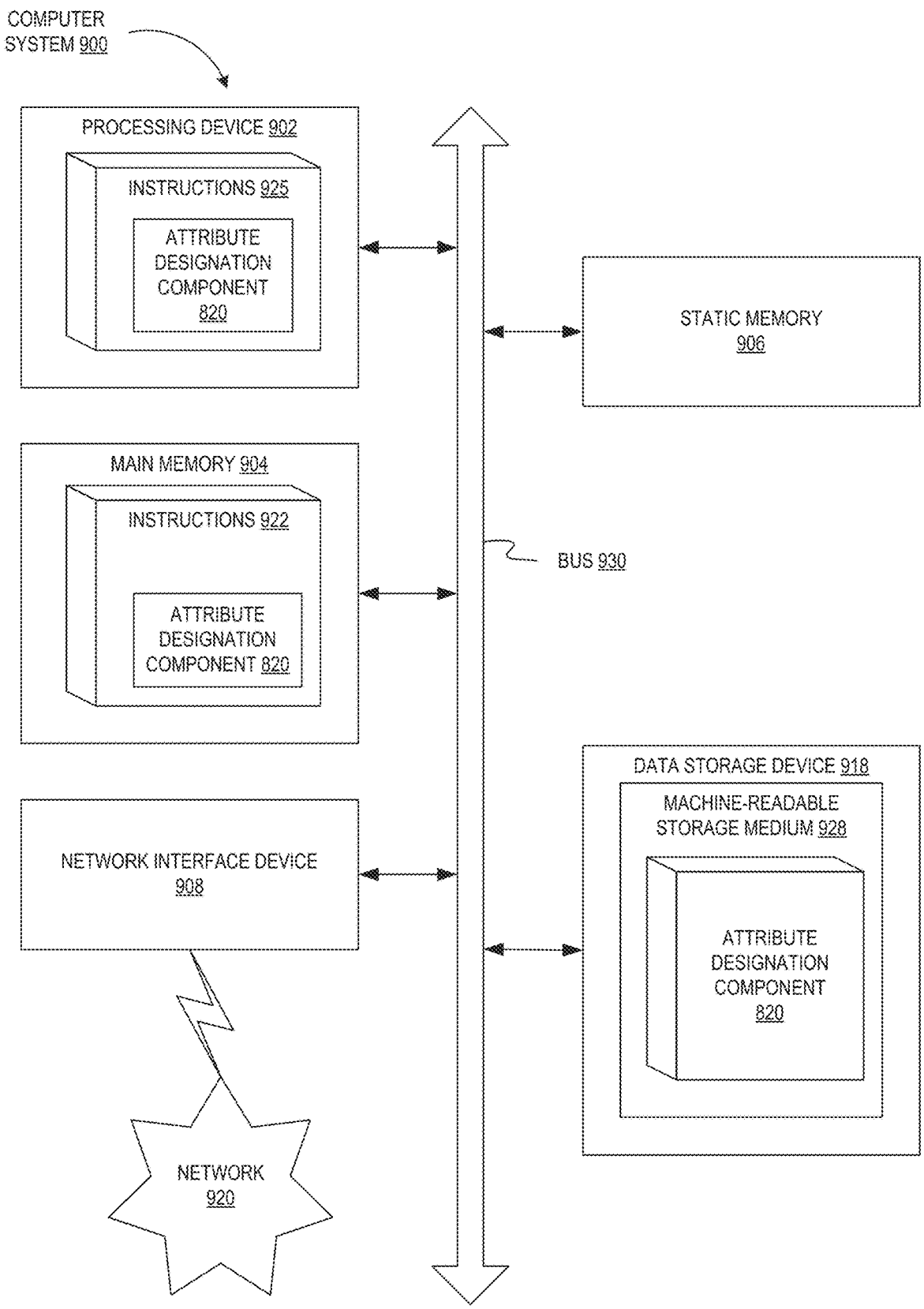
FIG. 9 is a block diagram illustrating an example computer system, in accordance with one implementation of the present disclosure.

FIG. 9 is a block diagram illustrating an example computer system, in accordance with one implementation of the present disclosure. FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of a server, such as network monitor entity 102 running system 800 to perform logical reasoning to assign attributes and perform a classification of network entities based on heuristics with associated belief values and resolving any conflicts between assigned attributes based on certainties of the belief values, as described herein.

The exemplary computer system 900 includes a processing device 902, a main memory 904 (e.g., read-only memory (ROM), flash memory, dynamic random access memory (DRAM), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic 926, which may be one example of system 800 shown in FIG. 8, for performing the operations and steps discussed herein.

The data storage device 918 may include a machine-readable storage medium 928, on which is stored one or more set of instructions 922 (e.g., software) embodying any one or more of the methodologies of operations described herein, including instructions to cause the processing device 902 to execute modules of system 800 (e.g., attribute designation component 820). The instructions 922 may also reside, completely or at least partially, within the main memory 904 or within the processing device 902 during execution thereof by the computer system 900; the main memory 904 and the processing device 902 also constituting machine-readable storage media. The instructions 922 may further be transmitted or received over a network 920 via the network interface device 908.

The machine-readable storage medium 928 may also be used to store instructions to perform a method of device attribute assignment and classification using logical programming with associated certainty indications, as described herein. While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   accessing entity property data associated with an entity coupled to a network;
   identifying one or more features for the entity based on the entity property data;
   determining, from a plurality of assignments corresponding to a set of rules applied to the one or more features, a first value for an attribute of the entity, wherein the plurality of assignments respectively assign a plurality of belief values to the first value for the attribute;
   determining, based on the plurality of belief values, a conflict of certainty levels associated with the attribute;
   selecting, by a processing device, a final value for the attribute of the entity based at least in part on the plurality of belief values;
   providing an explanation for the selection of the final value for the attribute, wherein the explanation explains the conflict of certainty levels based on the plurality of assignments; and
   performing a security action on the entity based on the final value for the attribute of the entity and a security policy associated with the final value for the attribute.

2. The method of claim 1, further comprising:
   determining a second value for the attribute of the entity based on the set of rules applied to the one or more features.

3. The method of claim 2, wherein selecting the final value for the attribute further comprises:
   selecting the first value for the attribute or the second value for the attribute.

4. The method of claim 1, wherein accessing entity property data comprises:
   monitoring network traffic associated with the entity coupled to the network; and
   extracting the one or more features for the entity from the network traffic associated with the entity.

5. The method of claim 1, wherein determining the first value for the attribute comprises:
   applying one or more heuristic rules to the one or more features of the entity, wherein each heuristic rule is triggered if a set of predicates of the heuristic rule matches with the one or more features of the entity.

6. The method of claim 1, wherein each heuristic rule has an associated belief value indicating a certainty and a validity of an attribute value assigned by the heuristic rule.

7. The method of claim 1, wherein the attribute comprises a role classification of the entity.

8. A system comprising:
   a memory; and
   a processing device, operatively coupled to the memory, the processing device to:
   access entity property data associated with an entity coupled to a network;
   identify one or more features for the entity based on the entity property data;

determine, from a plurality of assignments corresponding to a set of rules applied to the one or more features, a first value for an attribute of the entity, wherein the plurality of assignments respectively assign a plurality of belief values to the first value;

determine, based on the plurality of belief values, a conflict of certainty levels associated with the attribute;

select a final value for the attribute of the entity based at least in part on the plurality of belief values;

provide an explanation for the selection of the final value for the attribute, wherein the explanation explains the conflict of certainty levels based on the plurality of assignments; and perform a security action on the entity based on the final value for the attribute of the entity and a security policy associated with the final value for the attribute.

9. The system of claim 8, wherein the processing device is further to:

determine a second value for the attribute of the entity based on the set of rules applied to the one or more features.

10. The system of claim 9, wherein, to select the final value for the attribute, the processing device is further to:

select the first value for the attribute or the second value for the attribute.

11. The system of claim 8, wherein, to access entity property data, the processing device is to:

monitor network traffic associated with the entity coupled to the network; and extract the one or more features for the entity from the network traffic associated with the entity.

12. The system of claim 8, wherein, to determine the first value for the attribute, the processing device is to:

apply one or more heuristic rules to the one or more features of the entity, wherein each heuristic rule is triggered if a set of predicates of the heuristic rule matches with the one or more features of the entity.

13. The system of claim 8, wherein each heuristic rule has an associated belief value indicating a certainty and a validity of an attribute value assigned by the heuristic rule.

14. The system of claim 8, wherein the attribute comprises a role classification of the entity.

15. A non-transitory computer readable medium having instructions encoded thereon that, when executed by a processing device, cause the processing device to:

access entity property data associated with an entity coupled to a network;

identify one or more features for the entity based on the entity property data;

determine, from a plurality of assignments corresponding to a set of rules applied to the one or more features, a first value for an attribute of the entity, wherein the plurality of assignments respectively assign a plurality of belief values to the first value;

determine, based on the plurality of belief values, a conflict of certainty levels associated with the attribute;

select, by the processing device, a final value for the attribute of the entity based at least in part on the plurality of belief values;

provide an explanation for the selection of the final value for the attribute, wherein the explanation explains the conflict of certainty levels based on the plurality of assignments; and perform a security action on the entity based on the final value for the attribute of the entity and a security policy associated with the final value for the attribute.

16. The non-transitory computer readable medium of claim 15, wherein the instructions further cause the processing device to:

determine a second value for the attribute of the entity based on the set of rules applied to the one or more features.

17. The non-transitory computer readable medium of claim 16, wherein, to select the final value for the attribute, the instructions further cause the processing device to:

select the first value for the attribute or the second value for the attribute.

18. The non-transitory computer readable medium of claim 15, wherein, to access entity property data, the instructions cause the processing device to:

monitor network traffic associated with the entity coupled to the network; and extract the one or more features for the entity from the network traffic associated with the entity.

19. The non-transitory computer readable medium of claim 15, wherein, to determine the first value for the attribute, the instructions cause the processing device to:

apply one or more heuristic rules to the one or more features of the entity, wherein each heuristic rule is triggered if a set of predicates of the heuristic rule matches with the one or more features of the entity.

20. The non-transitory computer readable medium of claim 15, wherein each heuristic rule has an associated belief value indicating a certainty and a validity of an attribute value assigned by the heuristic rule.

* * * * *